C. MINSK.
STIRRING DEVICE.
APPLICATION FILED MAY 6, 1919.
1,313,830.
Patented Aug. 19, 1919.
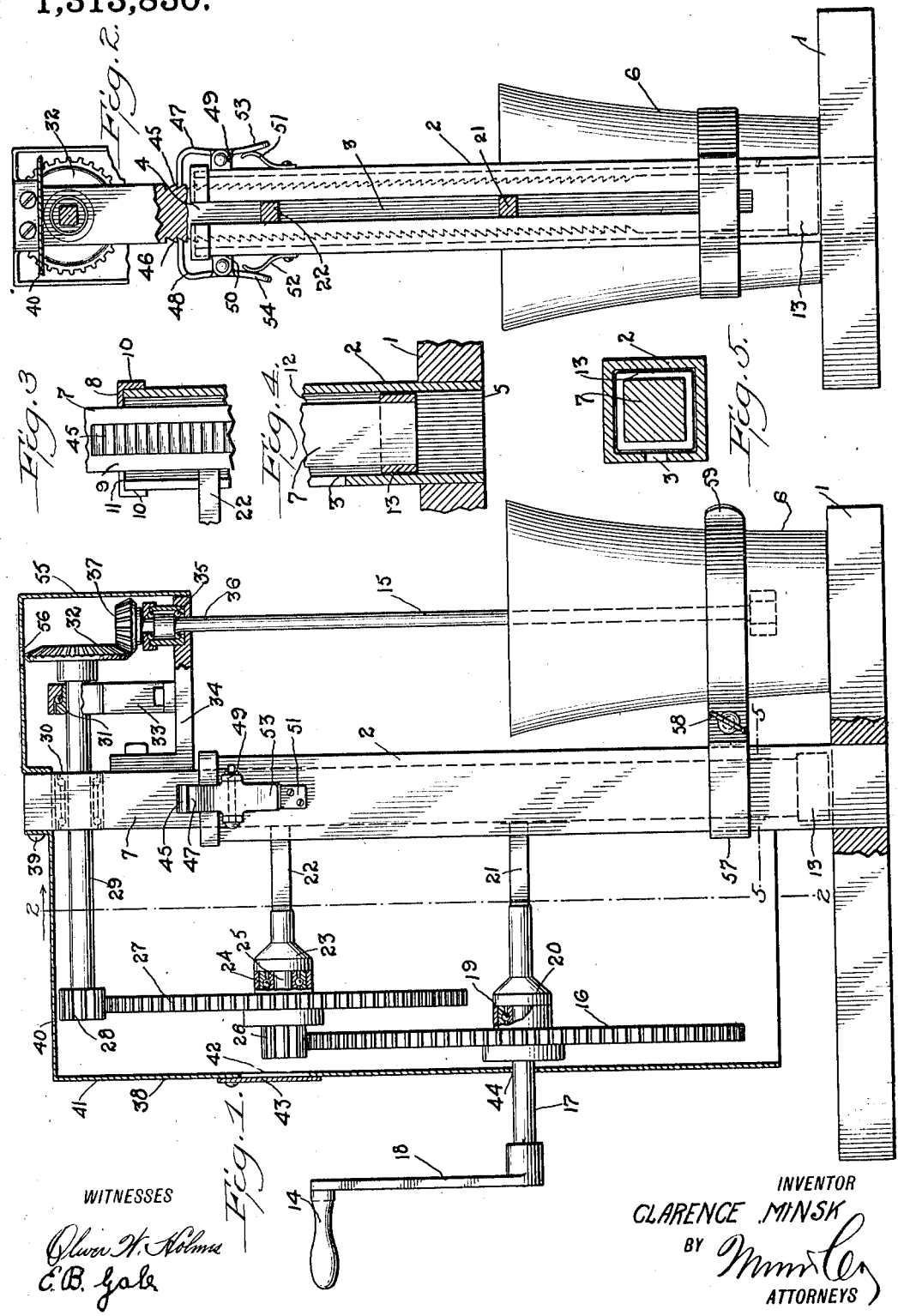
WITNESSES
INVENTOR
CLARENCE MINSK
BY
ATTORNEYS

UNITED STATES PATENT OFFICE.

CLARENCE MINSK, OF NEW YORK, N. Y.

STIRRING DEVICE.

1,313,830.  Specification of Letters Patent.  Patented Aug. 19, 1919.

Application filed May 6, 1919. Serial No. 295,068.

*To all whom it may concern:*

Be it known that I, CLARENCE MINSK, a citizen of Russia, and a resident of the city of New York, borough of Manhattan, in the county of New York and State of New York, have invented a new and Improved Stirring Device, of which the following is a full, clear, and exact description.

This invention relates generally to a new and improved stirring device and more specifically to a device of this character which is adapted to be manually operable, being particularly adapted for use in the preparation of egg and milk drinks, or for such other uses wherein a thorough mixing or agitation is desired.

One of the objects of this invention is to provide a stirring or mixing means which is simple in construction, compactly and conveniently arranged, and readily adjustable.

A further object is to provide a stirring device with its parts constructed and arranged to permit of its use by manual operation, it being particularly applicable for use in places wherein an electric motor or other power means are not available.

A device constructed in accordance with this invention is readily adapted to be portable and easily moved from place to place or it may be fixed in one position.

A further object is to provide in a manually or hand-operated stirring device a strong and rugged means arranged to permit a relatively high rotary speed of the stirrer or mixer to be had with a relatively slow turning of a handle.

Other objects and advantages will be apparent from the following description and parent from the following description and accompanying drawings in which similar characters of reference designate like parts in the several views.

Figure 1 is an elevation view in section showing the relative arrangement of the parts of this invention.

Fig. 2 is an elevation side view partly in section taken on the line 2—2 looking in the direction of the arrows of Fig. 1.

Fig. 3 is a fragmentary elevation side view partly in section showing the top portion of the main stand and the vertical moving plunger with the positioning serrations therein.

Fig. 4 is a broken sectional view showing the lower portion of the supporting stand for the stirrer.

Fig. 5 is a sectional view taken on the line 5—5 of Fig. 1.

In the drawings showing one of the preferred forms of this invention, a suitable base 1 is composed of a suitable material to firmly hold the stirring device in a solid position and to prevent undue vibration when in operation, its area being sufficient to prevent the stirring device from easily tipping and to afford a seat or rest for a glass 6 or other receptacle in which the liquid or other material to be mixed or agitated is placed.

Extending upwardly from the base is a hollow square tube or shaft 2 having a slot 3 in one side thereof open at its upper end 4. The lower end of the tube 5 is fixed in a suitable opening in the base 1 and is maintained in an upright position thereby. As a means of obtaining adjustment of the stirrer to different heights within the receptacle, to permit the stirrer to be raised free therefrom, and as a support for the main stirring mechanism, there is provided a square post 7 guided and telescoping within the shaft 2 by a cap 8 having an opening 9 therein to receive and guide the post 7, the said cap 8 having downwardly projecting sides 10 and a cut-away slotted portion 11 placed in alinement with the slot 3 at its upper end. The post 7 is of a smaller size than the inside dimensions of the shaft, thus leaving a space 12 between the post 7 and the inside of the shaft 2.

A collar 13 is secured to the lower end of the post 7 and extends therearound, substantially occupying the space between the post and the shaft, but being spaced from the inner shaft surface to permit freedom of motion. This collar acts as a guide for the lower end of the post to limit the motion thereof, and in addition thereto, it functions as a stop to permit the accidental withdrawal of the post from the shaft or guide 2 by contacting with the cap 8 carried at the upper part of the shaft.

There is provided, as a means of obtaining a relatively high speed of the stirrer or mixer, a train of gears between a manually or hand-operated handle 14 and the stirrer or mixer 15. A relatively large gear 16 is mounted on a shaft 17 to which is connected the handle 14 through an arm 18, said shaft 17 being supported in ball bearings 19 of the housing 20 supported by the arm 21, projecting through the slot 3, which arm is in turn carried by the post 7. Another arm 22 above the said arm 21, carried by the post 7 and projecting through the slot 3, carries another housing 23 at the end thereof, which housing in turn caries a ball bearing 24 in which is mounted a shaft 25. Another gear 26 mounted on the shaft 25, meshes with the gear 16, the said gear 26 being much smaller than the gear 16 so that when the handle 14 is rotated, the speed of the shaft 25 will be many times that of the shaft 17 due to the gear ratio. Another gear 27 is also carried on the shaft 25 and rotates with the gear 26, the said gear 27 being larger than the gear 26 and meshing with still another smaller gear 28, said gear being carried on a shaft 29 supported in ball bearings 30 carried in the upper end of the post 7, the arm 29 extending through the ball bearing to the other side of the post and through another ball bearing 31 to a beveled gear 32 mounted on the end thereof.

The ball bearing 31 is carried on an arm 33 which arm in turn is supported by a bracket 34 projecting from and connected by a suitable means to the upper end of the post 7. The ball bearing 31 further serves as a thrust bearing for the beveled gear 32. At the outer end of the bracket 34 is carried a ball bearing 35, through which bearing extends a shaft 36 connected at one end thereof by a suitable coupling 56 to the stirrer or mixer 15, the other end having fixed thereto a beveled gear 37 meshing with the said beveled gear 32 to be driven therefrom.

It is to be noted that due to the gear ratio between the gears 27 and 28, the shaft 29 will revolve at a greater speed than the said shaft 25. Further, the beveled gear 32 is larger than the gear 37 so that the shaft 36 will also revolve at a higher speed than the shaft 29. It is thus seen that there is a continuous step-up of the speed ratios driving from the main driving shaft 17 to the shaft 36 to which the stirrer or mixer is connected.

A suitable covering 38 is provided to substantially completely inclose and safeguard the gearing, said cover being connected to the upper end of the post by a screw 39 or other suitable means. The cover may be made of sheet metal or other suitable material and comprises a horizontally extending portion 40 and downwardly extending portions 41, one of the latter being provided with an opening 42 having a sliding cover 43 therefor, which may be moved so that the gears and bearing may be lubricated or inspected. The downwardly extending portion is provided with another opening 44 through which the shaft 17 projects.

The post member 7 is provided on opposite sides with a series of notched or toothed portions 45, 46 throughout substantially the length of the post, these serving as positioning notches or stops to receive suitable catches 47, 48, which are shown as bent finger portions pivoted in brackets 49, 50 attached by suitable means to the upper end of the shaft 2 on the sides corresponding to the sides of the post on which the notched surfaces are positioned. There are provided spring fingers 51, 52 attached to the opposite sides of the shaft 3 to engage the projecting ends 53, 54 of the bent finger members 47, 48 respectively, to keep them normally in contact with the notched portions 45, 46 of the post 7 so that the post member 7 may be raised at will to any desired position and will there be held by the finger members engaging the notched holding surfaces of the post, and if it is desired to lower the post 7, the ends 53, 54 of the finger members are depressed with the fingers against the spring members 51, 52, thus disengaging the bent portion 47, 48 of the finger members from the notched surfaces 45, 46 so that the post 7 may then be lowered to any desired position.

As a means of covering and protecting the beveled gears 32, 37 and shaft 3, there is provided another box-like cover 55, which also is provided with an opening 56 through which the gears may be inspected and lubricated.

As a means of positioning the receptacle 6 upon the base 1, there is provided a flat spring positioning member 57 bent around the lower portion of the shaft 2, being connected by a suitable thumb nut 58 and having projecting arms 59 extending around the glass or receptacle 6.

It is understood that no claim is here made to a stirring device in which an electric or other motor device is used for driving the stirrer and for obtaining the relatively high speed which is desired in a device of this character.

While but one preferred form of the invention has herein been shown, certain changes and modifications may be made without departing from the spirit and scope of this invention.

Having thus described the invention, what I claim as new is:

1. In a manually operable stirring device, telescoping members, one of said members comprising a relatively fixed hollow shaft member and the other member comprising a post-like member guided within said shaft member and movable relative thereto and a means for holding the post-like member in a predetermined position, said means comprising a notched surface carried by the post member and a coöperating yielding stop connection carried by said shaft.

2. In a stirring device, the combination of a hollow shaft having an open-ended slot in one side thereof, a post guided within said shaft, a toothed surface on one side of said post, a yielding catch member carried by said shaft and engaging the notched surface to position the post, an arm carried by the post extending outwardly therefrom and through the slot within said shaft, gearing journaled in said arm, a handle to turn said gearing, a shaft journaled in the upper part of said post having its ends projecting on opposite sides, a gear carried on one end of said shaft and engaging the gearing on said arm, a beveled gear carried at the opposite end of said shaft, a bracket fixed to the upper end of said post, a bearing at the outer end thereof, a shaft therein, a beveled gear carried by said shaft and engaging said first-named beveled gear and a coupling carried by said last-named shaft and adapted to receive a stirring device.

3. A manually operable stirring device comprising telescoping members, one of said members being movable with respect to the other, speed reduction mechanism carried by the movable member and arranged to be driven by the speed reduction mechanism.

4. A stirring device comprising a hollow shaft, a removable cap for the top of said shaft having an opening therein forming an inwardly projecting edge between the inner side of the shaft and the edge of the opening, a post telescoping within the shaft and guided through the opening in said cap and a collar carried by said post to guide the lower end thereof within the shaft and positioned to contact with the inwardly projecting edge of the cap to prevent the accidental withdrawal of the post from the shaft.

5. A manually operable stirring device comprising telescoping members, speed increasing mechanism, a stirring device carried by one of said members, a toothed surface in one of said members and a catch carried by the other member yieldingly engaging the toothed surface to position the members.

6. A stirring device comprising a base, a hollow shaft extending upward therefrom having an open-ended slot in one side thereof, a post guided within said shaft, means for positioning said post with respect to said shaft, an arm carried by said post and extending through said slot, a driving member rotatably carried by said arm, a means for manually moving said driving member, a bracket fixed to said post, a stirring device rotatably carried by said arm and a driving mechanism connecting said stirrer and said driving member.

CLARENCE MINSK.